United States Patent [19]
Porto

[11] Patent Number: 5,573,802
[45] Date of Patent: *Nov. 12, 1996

[54] COFFEE ROASTER OVEN CHAMBER

[75] Inventor: Brian Porto, Washington, D.C.

[73] Assignee: The Hugo Gepo Co., Inc., Silver Spring, Md.

[ * ] Notice: The term of this patent shall not extend beyond the expiration date of Pat. No. 5,500,237.

[21] Appl. No.: 588,616

[22] Filed: Feb. 6, 1996

Related U.S. Application Data

[63] Continuation-in-part of Ser. No. 404,651, Mar. 14, 1995, Pat. No. 5,500,237.
[51] Int. Cl.$^6$ ............................. A23F 5/00; A23N 12/00
[52] U.S. Cl. ............................. 426/466; 34/360; 34/576; 34/594; 99/474; 99/483; 426/467
[58] Field of Search .................................. 426/466, 467; 34/360, 576, 594; 99/286, 323.5, 474, 483

[56] References Cited

U.S. PATENT DOCUMENTS 5,500,237  3/1996  Gell, Jr. et al. ..................... 426/466

*Primary Examiner*—George Yeung
*Attorney, Agent, or Firm*—Harold Gell

[57] ABSTRACT

A coffee roaster oven chamber wherein coffee beans are heated and intermixed in a fluidized bed is fabricated as a unitary structure from a transparent material that allows incandescent coils to radiantly heat coffee beans while they are concurrently heated by air heated by the same coils. In a preferred embodiment the oven chamber is fabricated from glass as a single piece structure which may be removed from the coffee roaster for adding or removing coffee beans and cleaning.

10 Claims, 3 Drawing Sheets

COFFEE ROASTER OVEN CHAMBER

RELATED APPLICATIONS

This is a Continuation-in-Part of U.S. Pat. No. 5,500,237 filed 14 Mar. 1995 as U.S. Patent application Ser. No. 08/404,651 for "Removable Coffee Roaster Oven Chamber", the specification and drawings thereof which are incorporated herein by reference.

BACKGROUND OF THE INVENTION

The shortcomings of the prior coffee roasting systems utilizing a fluidized bed created by a flared chamber have been eliminated by the use of a rotating fluidized bed as described in U.S. Pat. No. 4,494,314 for "Coffee Roaster" and U.S. Pat. No. 5,359,788 for "Coffee Roaster" issued to Harold Gell on Jan. 22, 1985 and Nov. 1, 1994 respectively. With the advent of rotating fluidized bed applications to coffee roaster technology and transparent upper oven chambers which allow operators to monitor the roasting process, the problems involving the actual roasting technique have been solved. However, the different thermal expansion characteristics of the glass upper oven chamber and metal lower oven chamber results in a high failure rate of the glass chamber section and problems remain with respect to removing roasted coffee beans from the oven chamber, cleaning the oven chamber and manufacturing the oven chamber.

OBJECTIVES OF THE INVENTION

To avoid the shortcomings in the prior art coffee roasters, it is a primary objective of this invention to provide a transparent oven chamber fabricated as a unitary structure with openings in its lower section for admitting air to create a rotating fluidized bed of coffee beans within the oven chamber and an open top to allow roasting by-product gases and chaff to escape and to add and remove coffee beans.

It is a further objective of the present invention to provide an oven chamber as described above that is created from borosilicate glass.

Another objective of the present invention to provide an oven chamber as described above that is removable and replaceable by the operator to facilitate adding and removing coffee beans and cleaning.

A still further objective is to provide an oven chamber fabricated from a transparent material which will allow an incandescent heater to radiantly heat a coffee bean charge which is concurrently being heated with air previously heated by the incandescent heater.

The foregoing and other objectives of the invention will become apparent in light of the drawings, specification and claims contained herein.

SUMMARY OF THE INVENTION

A transparent oven chamber is fabricated from a high temperature glass, such as borosilicate glass, as a one piece body through which coffee beans may be heated by radiation from an incandescent heater. The oven chamber includes openings in the lower section for admitting heated air to assist in heating the coffee beans and to create a rotating fluidized bed of coffee beans within the oven chamber. The section of the oven chamber including the openings is shaped and dimensioned to fit within a coffee roaster plenum and thereby allow user removal and replacement of the oven chamber for facilitating removal of roasted coffee beans and for cleaning.

DESCRIPTION OF THE INVENTION

Figure 1:
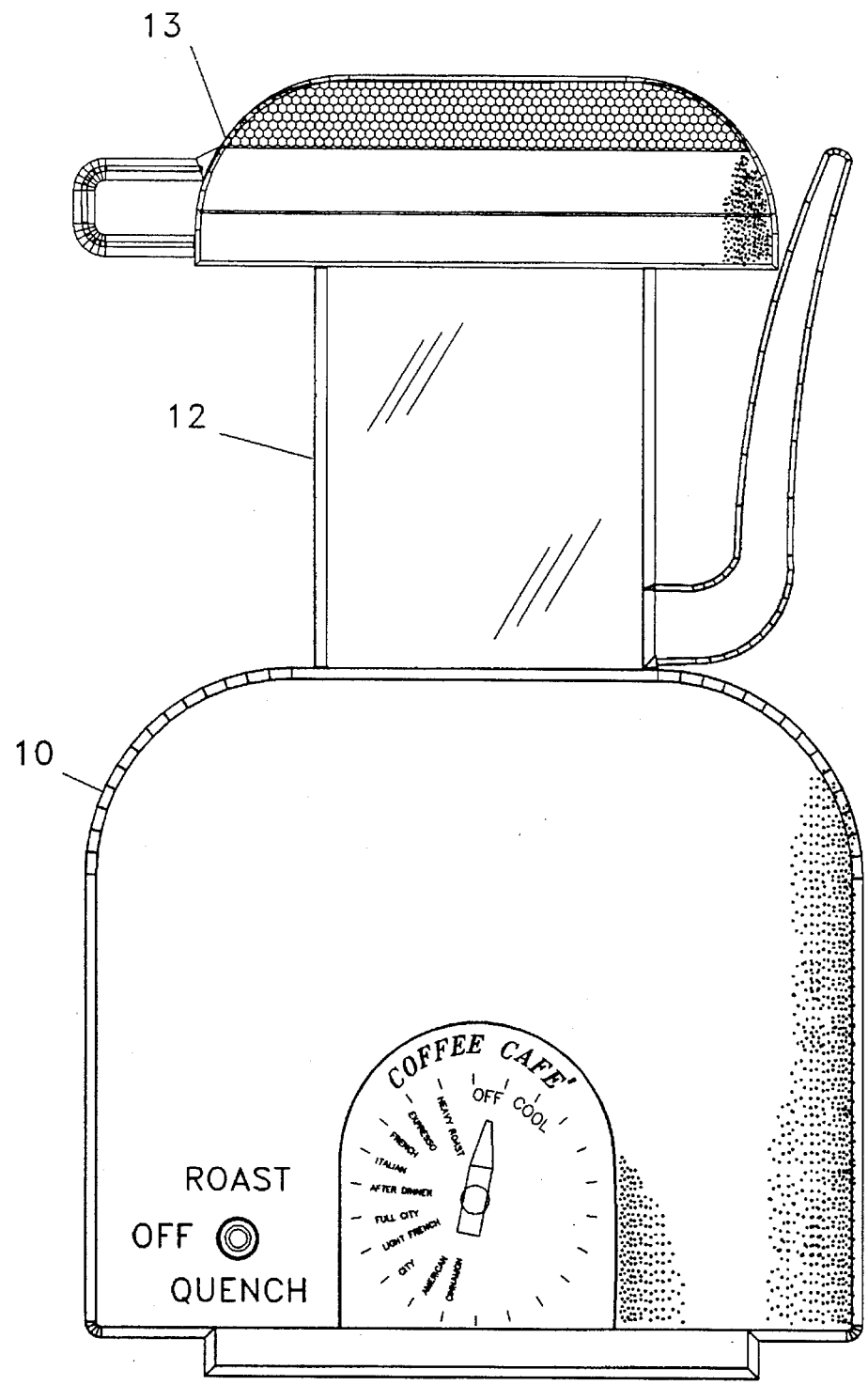
FIG. 1 is a front view of a coffee roaster illustrating the oven chamber.
Figure 2:
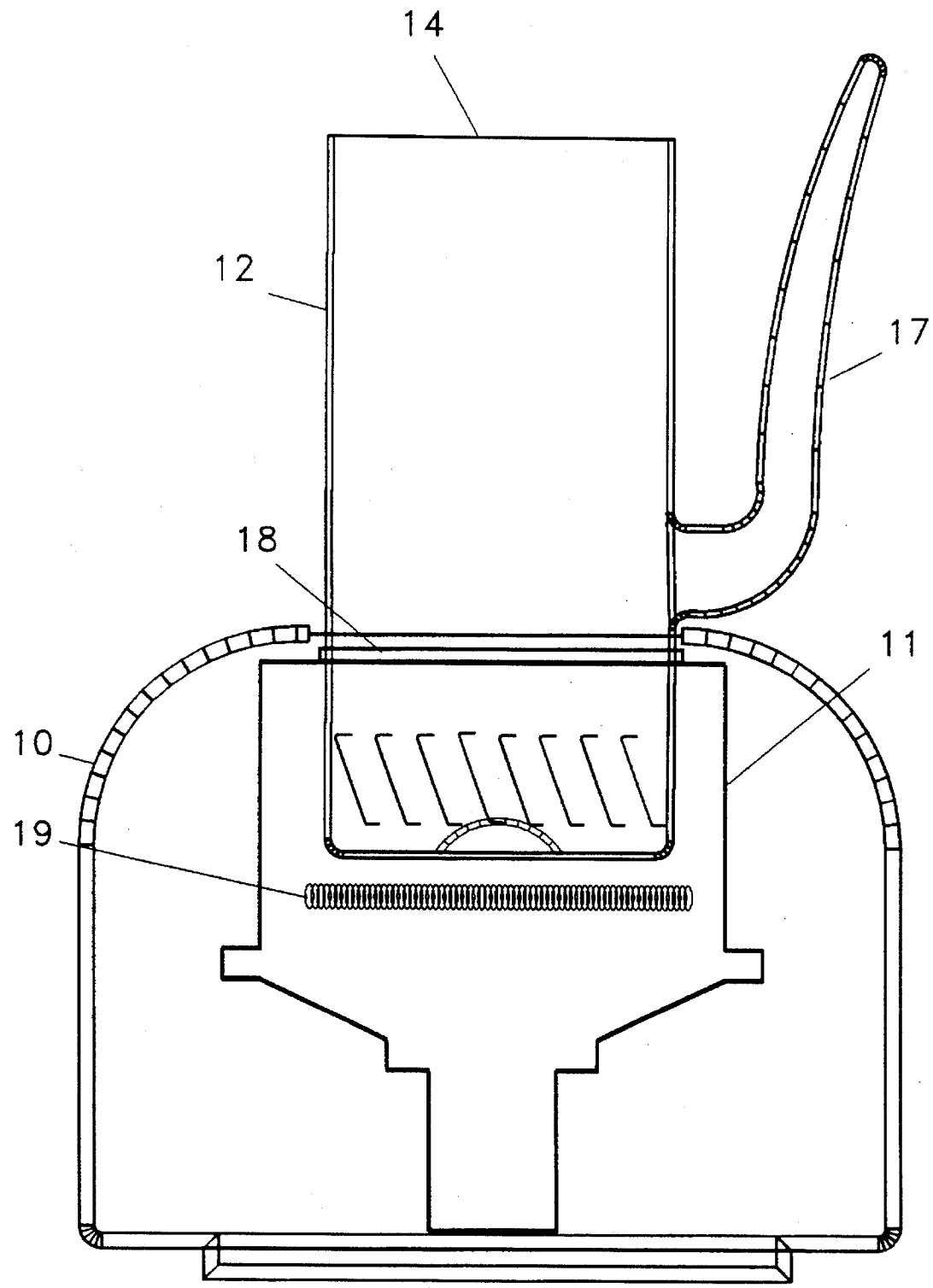
FIG. 2 is a sectional view of the coffee roaster illustrating the oven chamber seated in the plenum.

FIG. 1 is a front view of a coffee roaster incorporating the unitary transparent oven chamber of the present invention. The coffee roaster is comprised of a roaster housing 10 which includes heating and heater control means and an oven chamber receiving plenum, 11 of FIG. 2. The unitary oven chamber 12 is shown installed in a coffee roaster with the lower part of the transparent cylinder from which the oven chamber is formed seated within the roaster's plenum 11 and the upper or viewing chimney portion extending above the roaster housing. A chaff trap 13 fits over the access opening of the oven chamber. The chaff trap is removed when the oven chamber is being charged with coffee beans or when roasted beans are removed.

To charge the oven chamber of the preferred embodiment, the chaff trap 13 is removed and green coffee beans are added through the top, 14, of the oven chamber. For this step in the coffee roasting procedure using the preferred form of the invention, the oven chamber 12 may be installed in a coffee roaster or removed therefrom to be seated within the plenum 11 of the roaster before the actual roasting commences. In all instances, the chaff trap is replaced on the top of the oven chamber before the roaster is turned on.

An incandescent heater 19 heats coffee beans through the transparent body of the oven chamber and air passing through the plenum, causing coffee beans within the oven chamber to be roasted by the heated air and radiation from the incandescent heater.

When roasted coffee beans have been cooled, the chaff trap is removed and the oven chamber 12 lifted from the roaster, in any order, after which the roasted beans are poured from the oven chamber.

In an alternate embodiment, the removable, unitary oven chamber 12 may be secured within the roaster and roasted coffee beans removed therefrom by lifting and tilting the roaster. In this embodiment the oven chamber is removed for cleaning by placing it in a dishwasher or using manual means.

The oven chamber preferably is a one piece structure of metal, ceramic, glass or other suitable material that will withstand the heat of roasting coffee. A glass structure is preferred for ease of fabrication, but regardless of the material, the key feature of the oven chamber is that it is removable to facilitate cleaning and removing roasted coffee beans.

Figure 3:
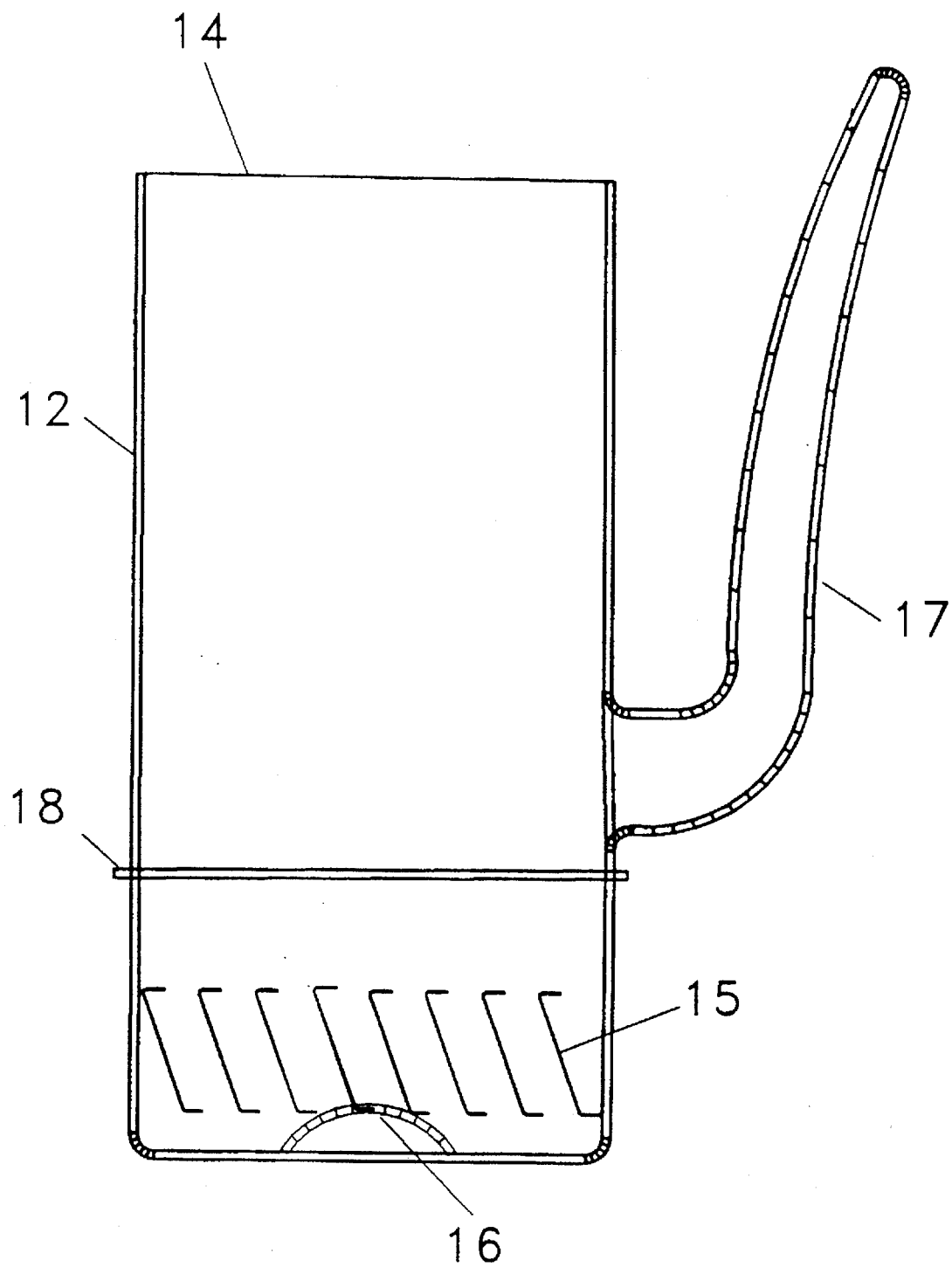
FIG. 3 is a side view of the one-peice oven chamber fabricated from a glass material.

In the preferred embodiment, the oven chamber 12 is a borosilicate glass cylinder, open at the top 14 and closed at the bottom as illustrated by FIG. 3. A plurality of openings 15 are located in the lower section of the cylinder. The openings may be in the form of louvers or simple slots cut through the cylinder forming passages which lie at an angle other than 180 or 360 degrees to the ray from the slot to the central axis of the cylinder. Thus when air is forced from the plenum of the roaster into the oven chamber, it flows along a path which is tangent to the oven chamber wall, causing the air to rotate about the vertical axis of the oven chamber.

A dome 16 is located in the center of the bottom of the oven chamber. It urges coffee beans at the center to migrate towards the wall where they come under the influence of the tangent flow of air from the plenum which causes the creation of a rotating fluidized bed.

A handle 17 may be provided to facilitate handling the oven chamber when it is hot. The handle may be an integral part of the oven chamber or an attachment.

An increased diameter upper oven chamber section or a flange or bead 18 may be provided to cooperate with the top of the coffee roaster plenum 11 to create an air dam to prevent air from escaping from the plenum along the outer wall of the oven chamber. If a bead or flange is used to create the air dam, it may be used as a means to temporarily secure the oven chamber to the roaster.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An oven chamber for coffee roasters of the class which roasts coffee by forcing heated air from a plenum through a bed of coffee beans whereby a fluidized bed of coffee beans is created, comprising:

a roasting chamber including a section dimensioned to permit insertion and removal thereof in the plenum of a coffee roaster;

means located in said section of said roasting chamber which is within the plenum of a coffee roaster when said roasting chamber is inserted into the plenum for admitting air into said roasting chamber; and an opening in said roasting chamber for permitting the escape of exhaust gases and chaff from said roasting chamber during the roasting process.

2. A coffee roaster oven chamber as defined in claim 1, wherein said roasting chamber is fabricated from a transparent material.

3. A coffee roaster oven chamber as defined in claim 2, wherein said transparent material is glass.

4. A coffee roaster oven chamber as defined in claim 1, wherein said means for admitting heated air comprises a plurality of openings in the wall of said roasting chamber.

5. A coffee roaster oven chamber as defined in claim 1, including means cooperating with the top of the coffee roaster plenum for creating an air dam to minimis air leaks between the coffee roaster plenum and the outer wall of said roasting chamber.

6. A coffee roaster oven chamber as defined in claim 1, including means for securing said coffee roaster oven chamber in the coffee roaster plenum.

7. A method of roasting coffee, including the steps of:

placing at least part of a removable oven chamber into a plenum;

creating a fluidized bed of coffee beans within said removable oven chamber by forcing air from said plenum into said removable oven chamber via openings in said removable oven chamber; and roasting the coffee beans comprising said fluidized bed by the concurrent application of radiation from an incandescent heater through said removable oven chamber and air previously heated by said incandescent heater as it passed through said plenum.

8. A method of roasting coffee as defined in claim 7, including the initial step of loading green coffee beans into said removable oven chamber before said step of placing said removable oven chamber into said plenum.

9. A method of roasting coffee as defined in claim 7, including the steps of:

removing said removable oven chamber from said plenum after said coffee beans have been converted to roasted coffee beans; and removing coffee beans from said removed removable oven chamber.

10. A method of roasting coffee as defined in claim 9, including the step of cooling said roasted coffee beans and said removable oven chamber by replacing said heated air with ambient temperature air after said beans have reached a desired degree of roast and before said step of removing said removable oven chamber from said plenum.

* * * * *